May 16, 1933.   S. H. H. PARSONS   1,908,860
DEMOUNTABLE PACKING
Filed Nov. 13, 1930
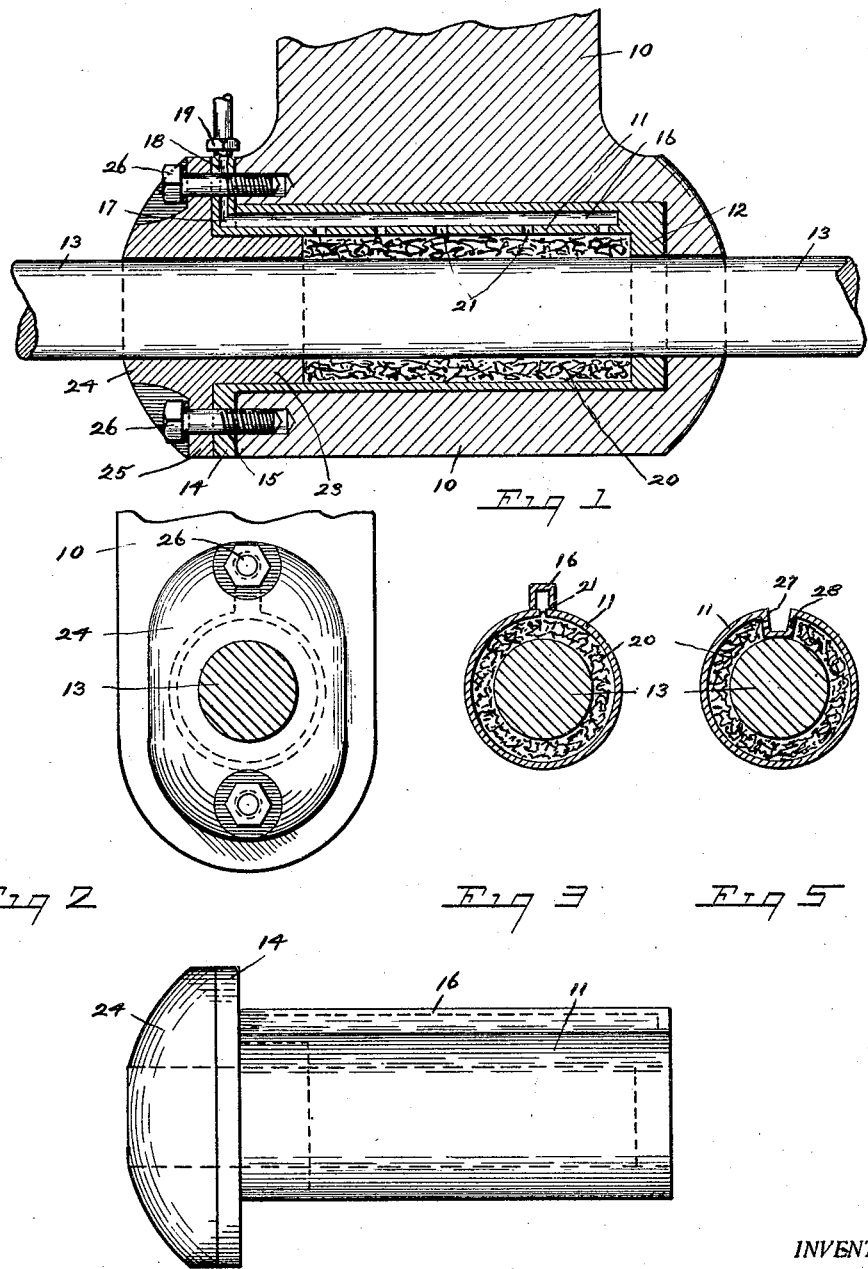
INVENTOR.
Sylvanus H. H. Parsons
BY
John J. Thompson
ATTORNEY.

Patented May 16, 1933

1,908,860

UNITED STATES PATENT OFFICE

SYLVANUS H. H. PARSONS, OF COSCOB, CONNECTICUT

DEMOUNTABLE PACKING

Application filed November 13, 1930. Serial No. 495,311.

This invention relates to a novel form of packed bearing or stuffing box which may be constructed as a unit and mounted as desired, and when worn or when it is desired to repack the bearing, the unit may be removed as a whole without dissembling the same, thus providing many advantages over the usual style of bearing where the packing has to be removed in parts from a long bearing.

The object of the invention is to provide a packed bearing in the form of a complete unit for insertion into a mounting such as the strut of a boat.

Another object of the invention is to provide a unit bearing containing few parts, readily renewable and easily mounted without the use of complicated templates or tools.

A further object being to provide a unit bearing in which the packing may be removed as a unit and in which lubricant is introduced to the packing.

This type of unit bearing will take the place in many cases of Babbitt bearing and may be used with out caps for the bearings, as it may be inserted from the end, and if desired it may be constructed with a packing gland upon each end, and any form of packing may be used, such as wood, babbitt, etc.

With these and other objects in view, my invention consists in certain construction and combination of parts as will hereinafter be fully described and claimed and illustrated in the accompanying drawing in which like figures of reference refer to corresponding parts in all of the views, and it is understood that slight changes may be made without departing from the spirit of the invention.

In the drawing:—

Figure 1 is a longitudinal sectional view of the strut of a boat with my unit bearing mounted therein.

Figure 2 is an end view of the strut and bearing, showing the attaching means.

Figure 3 is a cross sectional view of the bearing, taken on the line A—A of Figure 4.

Figure 4 is a side elevation of the bearing unit.

Figure 5 shows a cross section of a modified form of casing, where the oil container is formed within, so that no keyway is required in the outer bearing.

Referring to the drawing:—

The strut of a boat is indicated by the numeral 10, but it is understood that the bearing may be mounted in any desirable place or used for any desirable purpose where a packed bearing or stuffing box is required which may be removed as a unit.

The unit comprises a cylindrical member 11 of larger internal diameter than the shaft for which it is intended, and formed on the inner end with an inwardly extending flange 12 allowing free rotation of the shaft 13; while the other end of said tubular member 11 is formed with an external flange 14 formed with the mounting bolt holes 15.

Upon the upper side of said tubular member 11 is secured in some suitable manner a hollow key 16 which is closed on one end and formed with a duct 17 on the other end which communicates with a duct 18 formed in the flange 14 through which the lubricant is carried from some suitable supply by the fitting 19 threaded therein.

This hollow key 16 communicates with the packing rings 20 which are placed within the member 11 in contact with the shaft 13, by a series of openings or ducts 21 formed in the wall of the member 11 in registry with said key 16 so that the lubricant is carried to the packing rings and also to the metallic lubricant distributor rings 22 which are disposed between the packing rings 20 but which do not come into contact with the shaft.

For retaining the packing rings in place and also for mounting the unit to the strut, there is provided the packing gland 23 which is formed with the head 24 and the flange 25 which registers with the flange 14 and is formed with bolt holes in registry with those in the flange 14 for the reception of the bolts 26 which are threaded into the strut 10, thus not only holding the packing but the entire unit to the strut.

In mounting the unit to the strut 10 or other object a hole slightly larger than the diameter of the shaft is bored through the same, and is then counterbored the size of the outer diameter of the member 11, and is provided with a keyway for the key 16 and two tapped holes for the attaching bolts 26.

By the removal of the bolts 26 the entire bearing as a unit may be removed from the strut and a new bearing inserted or the same repacked and again inserted, and this can be accomplished under water or in places where the packing could not be removed bit by bit.

Having thus described my invention, what I claim as new and desire to secure by Letters Patent is:—

A renewable packing unit for stuffing boxes, comprising in combination with a keyway formed in said stuffing box, of a container adpated to be inserted within said stuffing box, a hollow key formed on said container and adapted to fit within said keyway, packing material contained within said container, means for securing said container to said stuffing box, and means for supplying a lubricant to said hollow key.

In testimony whereof I affix my signature.

SYLVANUS H. H. PARSONS.